S. L. McADAMS.
BEARING FOR TROLLEY WHEELS.
APPLICATION FILED JAN. 27, 1911.
1,132,949.
Patented Mar. 23, 1915.
2 SHEETS—SHEET 1.
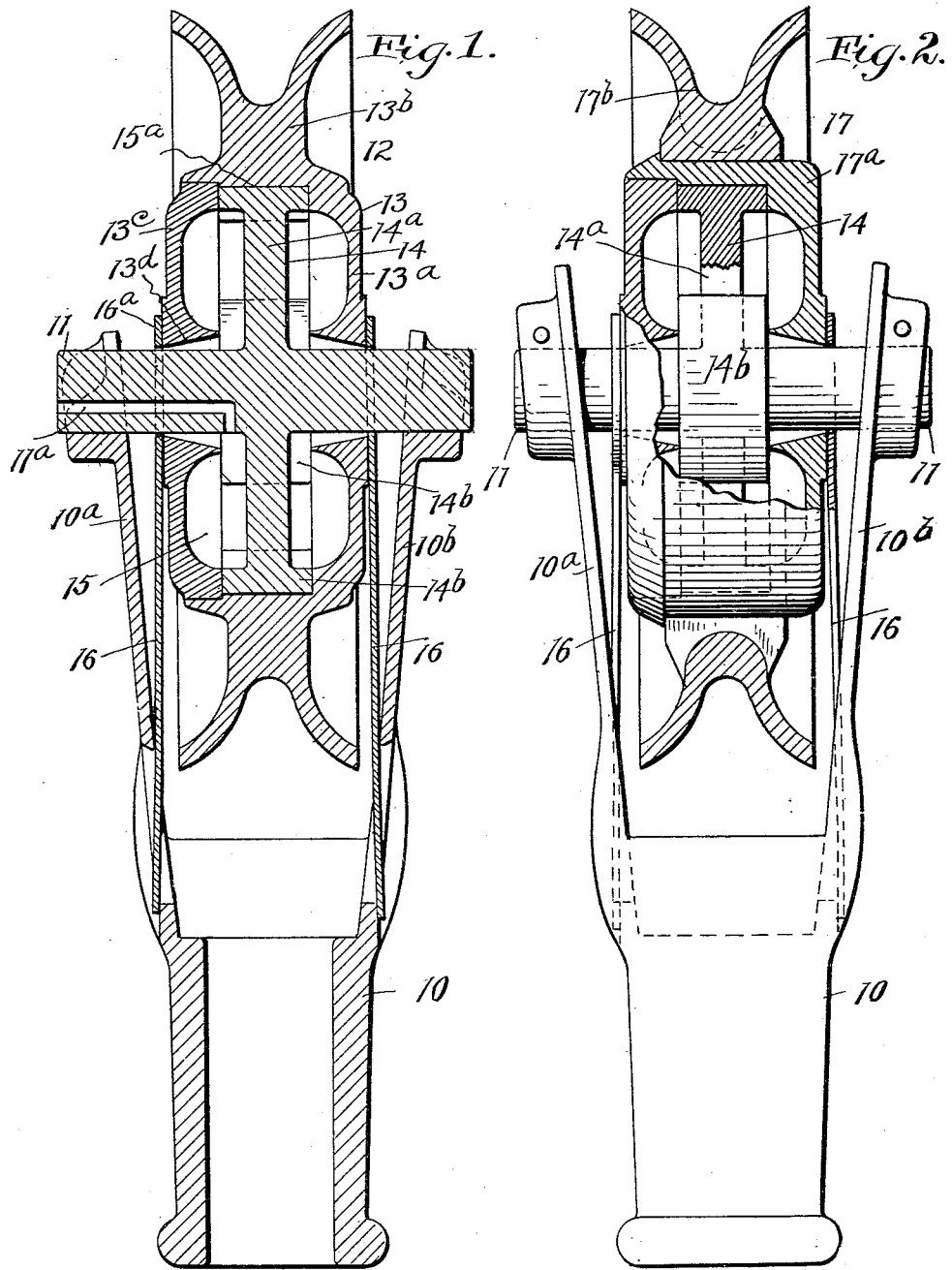

S. L. McADAMS.
BEARING FOR TROLLEY WHEELS.
APPLICATION FILED JAN. 27, 1911.
1,132,949.
Patented Mar. 23, 1915
2 SHEETS—SHEET 2.
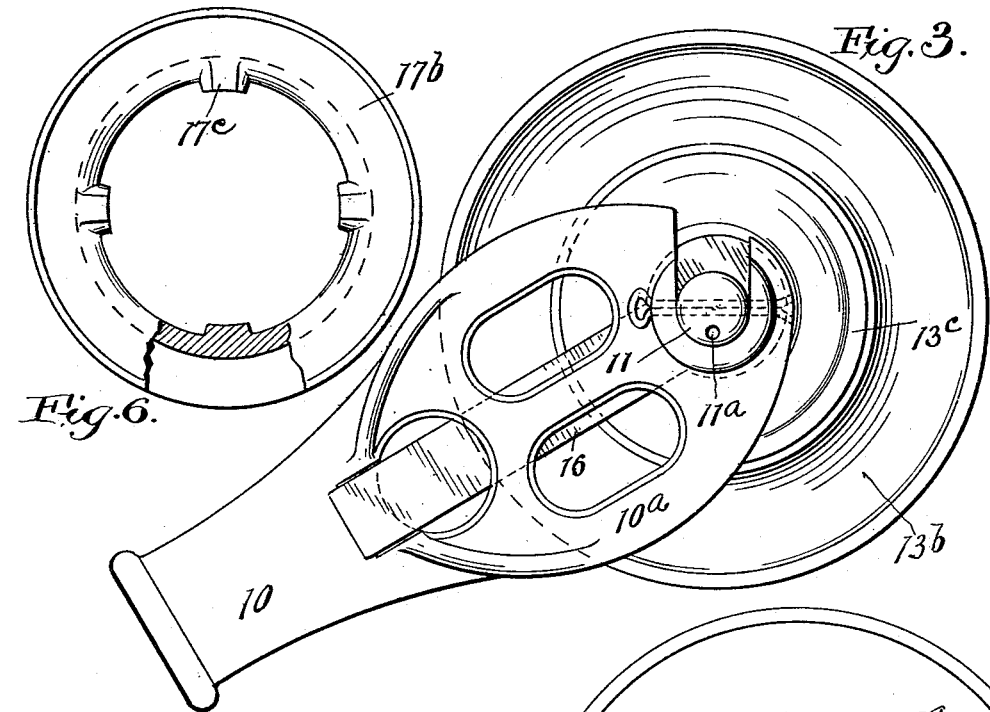
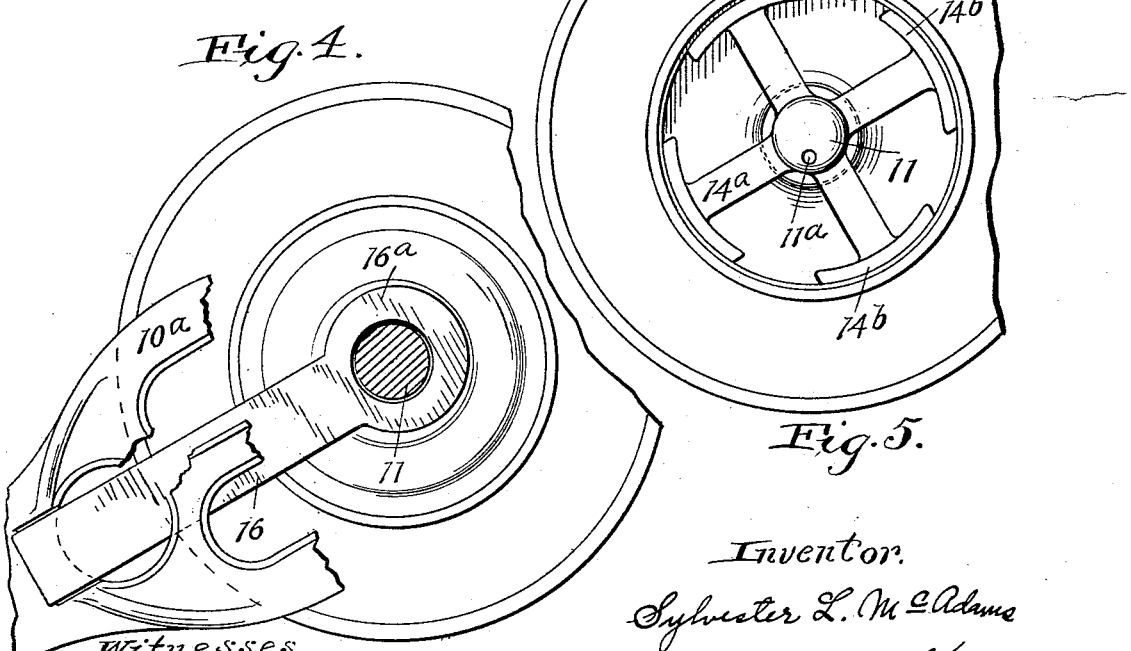
Inventor.
Sylvester L. McAdams
by Thurston & Kwis
attys.
Witnesses.
E. B. Gilchrist,
H. R. Sullivan.

UNITED STATES PATENT OFFICE.

SYLVESTER L. McADAMS, OF CLEVELAND, OHIO, ASSIGNOR TO THE CLEVELAND TROLLEY WHEEL COMPANY.

BEARING FOR TROLLEY-WHEELS.

1,132,949.  Specification of Letters Patent.  Patented Mar. 23, 1915.

Application filed January 27, 1911. Serial No. 604,975.

*To all whom it may concern:*

Be it known that I, SYLVESTER L. MC-ADAMS, a citizen of the United States, residing at Cleveland, in the county of Cuyahoga and State of Ohio, have invented a certain new and useful Improvement in Bearings for Trolley-Wheels, of which the following is a full, clear, and exact description.

This invention relates to improvements in self-oiling trolley wheels and has for its object the provision of a trolley wheel which has longer life and is more durable than the wheels ordinarily employed and at the same time is more effective and efficient than the latter.

It is a well known fact that the trolley wheels in general use are short lived due to the wear on the bearings because of inadequate lubrication and improper construction, and due to the cutting of the rim by the trolley wire.

A great deal of time and money have been expended in an endeavor to produce a trolley wheel which is more satisfactory than the commonly employed simple form of trolley wheel. However, when the life of the wheel, its first cost and general efficiency are taken into consideration, as far as I am aware, no wheel has ever been produced, prior to my invention, which is as satisfactory as the wheel generally employed.

I have produced a trolley wheel which by careful durability, time and efficiency tests has proven to be far more satisfactory than the wheel ordinarily employed, and although its first cost is more than that of some of the wheels at present employed, still the increase in life, durability and efficiency is far greater in proportion than the increase in cost.

The wheel constructed in accordance with my present invention comprises what I term "a wheel within a wheel," the inner wheel being fixed to or integral with the spindle which is stationary relative to the harp, and the outer wheel being in the form of a shell which rotates on the inner wheel and is provided with a grooved rim portion which may be either integral or removably secured to the shell. The outer wheel or shell is provided on the interior and at the base of the grooved rim portion with an annular bearing groove which receives the outer portion or portions of the inner wheel and has a bearing thereon, and this shell forms an oil receptacle or chamber which is adapted to be supplied with a quantity of oil to lubricate the bearings on the interior of the shell throughout the life of the wheel. The shell has at the middle thereof a pair of oppositely disposed spindle openings which are slightly larger in diameter than the spindle and is provided about the spindle and spindle openings with inwardly projecting flanges which serve to throw back to the interior of the shell, in this case, nearly all of the oil which passes axially outward along the spindle to the narrowest portions of the spindle openings.

Inasmuch as there is usually a film of oil between the inner fixed portion and the outer rotating portion of the wheel, I find it desirable to employ brushes or contact springs such as are usually employed with the ordinary form of trolley wheel, these brushes being carried by the harp and bearing with yielding or spring pressure against the sides of the wheel, about the spindle and adjacent the spindle openings.

I have found that unless the bearing surfaces of the brushes are slightly lubricated they wear out and must be replaced much sooner than the other portions of the wheel, and therefore to extend the life of the brushes and to avoid the necessity for their frequent replacement and in fact to make them as long lived as the other portions of the wheel which are subjected to wear or depreciation, I provide means whereby the oil in the oil inclosure or shell not only serves to lubricate the bearing surfaces of the wheel itself, but also lubricates the brushes. I have found that by properly proportioning the spindle openings in the side walls of the rotating wheel or by providing clearance spaces of the proper amount between the spindle and side walls, all the oil which passes axially along the spindle in an outward direction, on reaching the narrowest portions of the spindle openings attaches itself to the side walls and is thrown to the interior of the chamber by reason of the flaring flanges. I have discovered also that by making the clearance spaces slightly less than is necessary to cause the return of all the oil to the interior of the chamber, just sufficient oil will be permitted to escape to properly lubricate the contact brushes. The quantity of oil which is allowed to pass through the spindle openings to lubricate the brushes is sufficient to give the brushes long life, but is insufficient to materially affect their efficiency as current collectors.

My invention may be further briefly summarized as consisting in certain novel details of construction and combinations and arrangements of parts which will be described in the specification and set forth in the appended claims.

Reference is had to the accompanying sheets of drawings wherein—

Figure 1 is a longitudinal sectional view of a trolley harp and trolley wheel embodying my invention; Fig. 2 is a similar view showing a slight modification; Fig. 3 is a side view of the harp and wheel shown in Fig. 1 on a slightly reduced scale; Fig. 4 is a similar view with a portion of the harp broken away so as to show more clearly a contact brush which is lubricated by oil passing from the shell or oil chamber; Fig. 5 is a side view of the wheel shown in Fig. 1 with the cap or one of the side portions of the shell or rotating wheel removed so as to show in elevation the inner or fixed wheel; and Fig. 6 is a detached view of the rim portion of the wheel shown in Fig. 2.

Referring first to Figs. 1, 3, 4 and 5, 10 represents a harp provided with the usual arms $10^a$ and $10^b$, which at their upper ends are provided with slots or grooves adapted to receive and have secured therein a spindle 11 of the trolley wheel. The trolley wheel which may be designated as a whole by the reference character 12 includes an outer or rotating portion 13 which I term the outer wheel or shell and an inner or relatively fixed spider or so-called wheel 14, upon which the outer portion rotates and which is in this case integral with the spindle 11. The rotating wheel 13 includes a main portion $13^a$ carrying a grooved rim $13^b$ and a removable side or cap $13^c$ which may be secured to the portion $13^a$ in various ways, but preferably by being forced with a tight fit into a suitable groove or recess of the portion $13^a$.

The inner or stationary spider or wheel 14 consists in this case in addition to the spindle of a plurality of spokes or arms $14^a$ provided at their outer ends with arc shaped bearing heads $14^b$ which have greater width than the arms and form bearings for the outer wheel, these bearing heads forming parts or sections of an interrupted or divided felly.

The shell is provided on the interior with an oil chamber or inclosure which may be designated by the reference character 15 and at the inner periphery of this chamber or inclosure and a short distance from the base or inner portion of the grooved rim $13^b$ for the reception of the trolley wire, is an annular bearing groove $15^a$ which receives and has a bearing on the portions $14^b$ of the inner member 14. This bearing groove has an annular peripheral portion which engages or bears upon the outer or peripheral portions of the bearing heads $14^b$ and has parallel side portions formed by inwardly extending shoulders on the main portion $13^a$ and the movable cap $13^c$ of the rotating wheel. The distance between these shoulders or parallel side bearing surfaces is such that the outer wheel will have a close but running fit on the bearing heads of the inner wheel 14, but lateral vibration of the rotating wheel will be prevented.

The sides of the shell or rotating portion 13 are provided with oppositely disposed spindle openings and on the interior these sides or side portions are provided with inwardly projecting flanges $13^d$ flaring or tapered outwardly with respect to the spindle. The purpose of the taper is, as is readily apparent, to cause the return of the oil which passes axially outward along the spindle, to the interior of the shell or to the periphery of the oil chamber or inclosure. These spindle openings are made slightly larger in diameter at their narrowest portion than the spindle so that the latter will be free of and will not touch the side portions of the wheel and the clearance between the side walls and spindle is preferably made such that nearly all (but not quite all) of the oil which tends to pass axially along the spindle out of the chamber is thrown back by centrifugal force into the chamber.

It will be seen that with this trolley wheel, the rotating wheel or portion 13 has a very large bearing on the outer bearing surfaces or periphery of the inner wheel or portion 14 and that the bearing surfaces are at all times when the wheel is in rotation in the medium of the oil which is thrown outwardly by centrifugal force, the oil being brought directly into the annular bearing groove $15^a$ by reason of the fact that I employ no continuous felly but merely arc shaped bearing heads $14^c$ which permit the oil to pass outwardly between them onto the bearing surfaces.

With this construction, as before stated, there is a film of oil between the inner and outer wheels when the outer wheel is in rotation, and consequently for the proper collection of current, I employ contact springs or brushes 16 which are carried by the harp and are provided at their upper ends with annular bearing portions $16^a$ which surround the spindle and bear on the sides of the shell or rotating wheel adjacent the spindle openings therein. In order that the brushes or springs 16 may not be rapidly worn away by contact with the rotating wheel, I provide means whereby these brushes are continuously supplied with just sufficient lubricant to minimize the wear on the brushes.

This I accomplish by providing clearance spaces between the spindle and side walls such that instead of all the oil which passes axially along the spindle being returned to the chamber, a very small portion will be permitted to escape and find its way between the surfaces of the brushes and the shell on which the brushes bear. The quantity of oil which is thus allowed to pass outward and lubricate the brushes need be only very small to accomplish the desired result. Consequently, with this construction, not only do I provide in a trolley wheel an oil chamber which constantly lubricates the bearing surfaces for the main rotating portion, but the oil which is supplied to this chamber also lubricates in just the desired manner and to the desired extent the brushes which bear on the shell on the exterior of the oil inclosure.

The oil may be admitted to the oil chamber or inclosure 15 in various ways, but I prefer to provide in the spindle 11 an oil opening or passageway 11$^a$ which extends from one of the ends of the spindle inwardly in an axial direction and thence downwardly or in a radial direction so that oil supplied to the end of the passageway 11$^a$ will flow along the passageway and drop into the oil chamber.

While I prefer to so proportion the spindle openings that a slight amount of oil is permitted to escape so as to lubricate the contact brushes, still I consider it within the scope of my invention to proportion the spindle openings so that none of the oil is permitted to escape, such as when a lubricant of good conductivity is employed, in which case the brushes might be dispensed with.

In the construction shown in Figs. 2 and 6, the harp, spindle, inner wheel, and collecting springs or brushes are identical in form and construction with the similar or corresponding parts shown in Figs. 1, 3, 4 and 5, and are in Fig. 2 given the same reference characters. The outer or rotating wheel which in Fig. 2 is designated 17 is slightly different in construction from the rotating wheel 13 shown in Fig. 1, being in this case provided with a shell 17$^a$ which is cylindrical in shape and as in the first instance forms an oil chamber, the peripheral or cylindrical wall of which has a bearing on the inner wheel or relatively fixed part. This cylindrical shell 17$^a$ is formed in two parts described in connection with the construction shown in Fig. 1 and is provided with the same form of spindle openings, and with the oil return flanges, the openings permitting a very slight quantity of oil to escape from the inclosure and to lubricate the brushes 16. This shell 17$^a$ is provided with a rim portion having a plurality of inwardly projecting bearing lugs 17$^c$ which are adapted to tightly engage the outer periphery of the shell 17$^a$.

The tests of my improved trolley wheel show that practically the only wear after a long period of use occurs at the grooved rim, very little wear on the bearing surfaces being apparent because of the effective lubrication and the extent of the bearing surfaces. Consequently, in the construction shown in Fig. 2, the part which is most susceptible to wear can be removed when necessary and replaced with a new rim, the other parts being used repeatedly. However, by reason of the fact that the friction at the bearings is so slight and that the wheel runs so smoothly at all times, the wear or cutting of the rim by the trolley wire is minimized, and the trolley remains in engagement with the trolley wheel more effectively than heretofore because all lateral vibration of the wheel is prevented.

I am aware that self oiling wheels have been proposed but such wheels have not been successful, principally because the oil could not be retained in the oil chambers, and for the further reason that such wheels were not constructed along good mechanical lines and were in fact impracticable.

Having thus described my invention, what I claim is:

1. A self-oiling trolley-wheel, comprising a fixed spindle, a spider secured to said spindle having a bearing rim, a rotary wheel member having an outer wire-engaging groove and an inner shell-portion provided with an interior peripheral bearing surface adapted to engage and be supported by said bearing rim, the inner side walls of said shell-portion extending inwardly toward the spindle to form a lubricant chamber having a free and unobstructed passage so that a lubricant contained therein may be constantly carried by centrifugal force directly to said bearing.

2. A self-oiling trolley-wheel, comprising a fixed spindle having an integral spider provided with a bearing rim, a rotary wheel having an outer annular grooved portion and an inner shell portion having a lubricant-containing chamber inclosing said spider and provided with an annular bearing surface adapted to engage said rim, the side walls of said chamber forming annular channels which permit a free unobstructed centrifugal action during the rotation of the wheel to continually force lubricant outwardly to the bearing surface, said side walls terminating adjacent the spindle in inwardly extending flaring flanges.

3. A self-oiling trolley-wheel, comprising a fixed spindle having intermediate radial arms provided upon their outer ends with arcuate rim sections forming bearing heads, and a rotary wheel supported by said bearing heads and comprising an outer annular grooved portion and an inner shell portion having a lubricant chamber extending upon opposite sides of said arms and having an intermediate annular bearing surface engaging said bearing heads, the side walls of said chamber extending outwardly and radially inward from said bearing surface and providing unobstructed radial channels for the lubricant moving outwardly under centrifugal action to the bearing surfaces.

In testimony whereof, I hereunto affix my signature in the presence of two witnesses.

SYLVESTER L. McADAMS.

Witnesses:
H. R. SULLIVAN,
A. F. KWIS.